(12) United States Patent
Molnar et al.

(10) Patent No.: US 7,692,659 B1
(45) Date of Patent: Apr. 6, 2010

(54) COLOR-COMPRESSION USING AUTOMATIC REDUCTION OF MULTI-SAMPLED PIXELS

(75) Inventors: Steven E Molnar, Chapel Hill, NC (US); Daniel P. Wilde, Cedar Park, TX (US); Mark J. French, Raleigh, NC (US); Robert J. Stoll, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 571 days.

(21) Appl. No.: 11/557,076

(22) Filed: Nov. 6, 2006

(51) Int. Cl.
- *G06T 15/60* (2006.01)
- *G09G 5/36* (2006.01)
- *G06T 9/00* (2006.01)
- *G09G 5/02* (2006.01)
- *G06K 9/00* (2006.01)
- *G06K 9/40* (2006.01)
- *G06K 9/54* (2006.01)

(52) U.S. Cl. .................. 345/501; 345/426; 345/549; 345/555; 345/589; 382/162; 382/166; 382/254; 382/305

(58) Field of Classification Search .......... 345/418, 345/426, 581, 589, 612–614, 618, 545, 549, 345/555, 574; 382/162, 166, 232, 254, 276, 382/305; 711/100
See application file for complete search history.

(56) References Cited

U.S. PATENT DOCUMENTS

| | | | |
|---|---|---|---|
| 5,818,456 A | 10/1998 | Cosman et al. | |
| 6,072,500 A | 6/2000 | Foran et al. | |
| 6,366,289 B1 | 4/2002 | Johns | |
| 6,452,595 B1 | 9/2002 | Montrym | |
| 6,469,707 B1 | 10/2002 | Voorhies | |
| 6,614,449 B1 | 9/2003 | Morein | |
| 6,720,975 B1 | 4/2004 | Dietrich, Jr. | |
| 6,768,491 B2 | 7/2004 | Lefebvre et al. | |
| 6,825,847 B1 * | 11/2004 | Molnar et al. ............... | 345/555 |
| 6,989,835 B2 | 1/2006 | Deering et al. | |
| 6,999,100 B1 | 2/2006 | Leather et al. | |
| 7,123,277 B2 | 10/2006 | Brown et al. | |
| 7,170,515 B1 * | 1/2007 | Zhu ........................... | 345/422 |

(Continued)

OTHER PUBLICATIONS

Foley, et al. "Computer Graphics: Principles and Practice; $2^{nd}$ edition in C" © 1996 Addison-Wesley Publishing Co., Inc., pp. 132-137.

(Continued)

*Primary Examiner*—Wesner Sajous
(74) *Attorney, Agent, or Firm*—Patterson & Sheridan, LLP

(57) ABSTRACT

One embodiment of the present invention sets forth a technique for improving graphics rendering efficiency by processing pixels in a compressed format whenever possible within a multi-sampling graphics pipeline. Each geometric primitive is rasterized into fragments, corresponding to screen space pixels covered at least partially by the geometric primitive. Fragment coverage represents the pixel area covered by the geometric primitive and determines the weighted contribution of a fragment color to the corresponding screen space pixel. Samples associated with a given fragment are called sibling samples and have the same color value. The property of sibling samples having the same color value is exploited to compress and process multiple samples, thereby reducing the size of the associated logic and the amount of data written to and read from the frame buffer.

20 Claims, 8 Drawing Sheets

U.S. PATENT DOCUMENTS

2004/0196297 A1    10/2004   Elliott et al.
2005/0093872 A1*    5/2005   Paltashev et al. ............ 345/563
2005/0110792 A1*    5/2005   Morein et al. ............... 345/501
2005/0265614 A1    12/2005   Seong et al.
2005/0270305 A1    12/2005   Rasmussen et al.
2006/0170703 A1*    8/2006   Liao .......................... 345/613
2007/0285427 A1*   12/2007   Morein et al. ............... 345/501

OTHER PUBLICATIONS

Office Action. U.S. Appl. No. 11/557,068 dtd. Oct. 2, 2009.

* cited by examiner

COLOR-COMPRESSION USING AUTOMATIC REDUCTION OF MULTI-SAMPLED PIXELS

BACKGROUND OF THE INVENTION

1. Field of the Invention

Embodiments of the present invention relate generally to computer graphics and more specifically to color-compression using automatic reduction of multi-sampled pixels.

2. Description of the Related Art

A graphics rendering engine used to generate computer graphics images commonly includes a set of processing engines organized in a dataflow-style pipeline. Such images are conventionally composed of geometric primitives such as, for example, triangles.

To render a computer graphics image, each triangle is transformed into a screen-aligned coordinate system, referred to as "screen space." Manipulation of the geometric primitives up to and including the transformation into screen space are typically performed in the graphics rendering engine by a geometry processing unit, which passes results to a rasterization unit. The rasterization unit decomposes each geometric primitive into fragments for further processing, where there is a fragment associated with each screen space pixel either fully of partially covered by the geometric primitive. The coverage of a particular fragment (referred to herein as the "fragment coverage") indicates the portion of the screen space pixel corresponding to the fragment that is covered by the geometric primitive. Each fragment may also have associated data, including, without limitation, depth and color values. The depth value of a fragment is compared to a previous depth value to determine the visibility of that fragment. If the fragment is visible, the color value of the fragment either contributes to or uniquely determines the color of the corresponding pixel. When a fragment is found to be visible, its corresponding fragment data, including, without limitation, depth and color values, are written to a frame buffer memory.

Depth values and color values may each undergo read, write and read-modify-write operations with respect to the frame buffer memory. The graphics rendering engine and the frame buffer memory are commonly in different chips, requiring all frame buffer accesses to be conducted over a chip-to-chip interconnect. The data bandwidth between the graphics rendering engine and the external memory devices making up the frame buffer is called memory bandwidth, and is commonly one of the most significant factors limiting system performance.

As is well known, the quality of a rendered image is significantly improved with anti-aliasing. Super-sampling and multi-sampling are two common anti-aliasing techniques known in the art. Super-sampling involves generating multiple samples within a pixel, where each sample is independently computed for coverage and shading. The shaded samples are stored within a frame buffer and blended together for display. While super-sampling produces a very accurate and high quality image, super-sampling is quite expensive because each pixel within a rendered image requires the computational processing of multiple fully shaded samples, and shading is typically the most expensive operation within the graphics rendering engine.

Multi-sampling is a less expensive technique that uses one fully shaded color value and a coverage mask, rather than multiple fully shaded samples, to generate the multiple samples stored in the frame buffer that are ultimately blended together to produce a pixel within a rendered image. Multi-sampling is commonly used because of the substantial cost-versus-performance benefit that is typically achieved without a significant loss in overall image quality. Although multi-sampling saves shader processing relative to super-sampling, multi-sampling still requires a frame buffer with a sample per pixel and the attendant bandwidth, which can limit application performance. Some techniques exist for compressing multi-sampled color data by identifying situations in which all samples for a pixel have identical color values and can be represented by a single "reduced" color value per pixel. By storing reduced color values per pixel, rather than independent color values per sample, frame-buffer bandwidth can be substantially reduced. Reducing samples saves off-chip bandwidth. As screen resolutions and sample rates become higher, it becomes expensive and impractical to expand fragment colors into samples in the graphics rendering pipeline when many such fragments will ultimately be reduced, as described above.

As the foregoing illustrates, what is needed in the art is a technique that achieves the processing and bandwidth advantages of reduction throughout the entire graphics rendering pipeline.

SUMMARY OF THE INVENTION

One embodiment of the present invention sets forth a graphics pipeline configured to process blended color data of multi-sampled pixels. The graphics pipeline includes a shader engine configured to generate shaded pixels in reduced form based on a currently rasterized geometric primitive, where the shaded pixels are not expanded into samples, and a color raster operations (CROP) unit configured to receive the shaded pixels in reduced form from the shader engine, to accumulate a tile of shaded pixels, to read data from a memory tile corresponding to the tile of shaded pixels, and to determine whether the memory tile is compressed.

One advantage of the disclosed architecture is that in cases where geometric primitives fully cover memory tiles, the property of sibling samples having the same color value is exploited to process multi-sampled color data as pixels, rather than as samples, throughout the color rendering pipeline, thereby reducing the size of the associated logic and the amount of data written to and read from the frame buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention improves the overall efficiency of a graphics rendering engine by exploiting a redundancy in anti-aliased color samples to reduce pixel data path processing, thereby improving overall efficiency and simultaneously reducing the bandwidth requirements associated with color buffer access.

Figure 1:
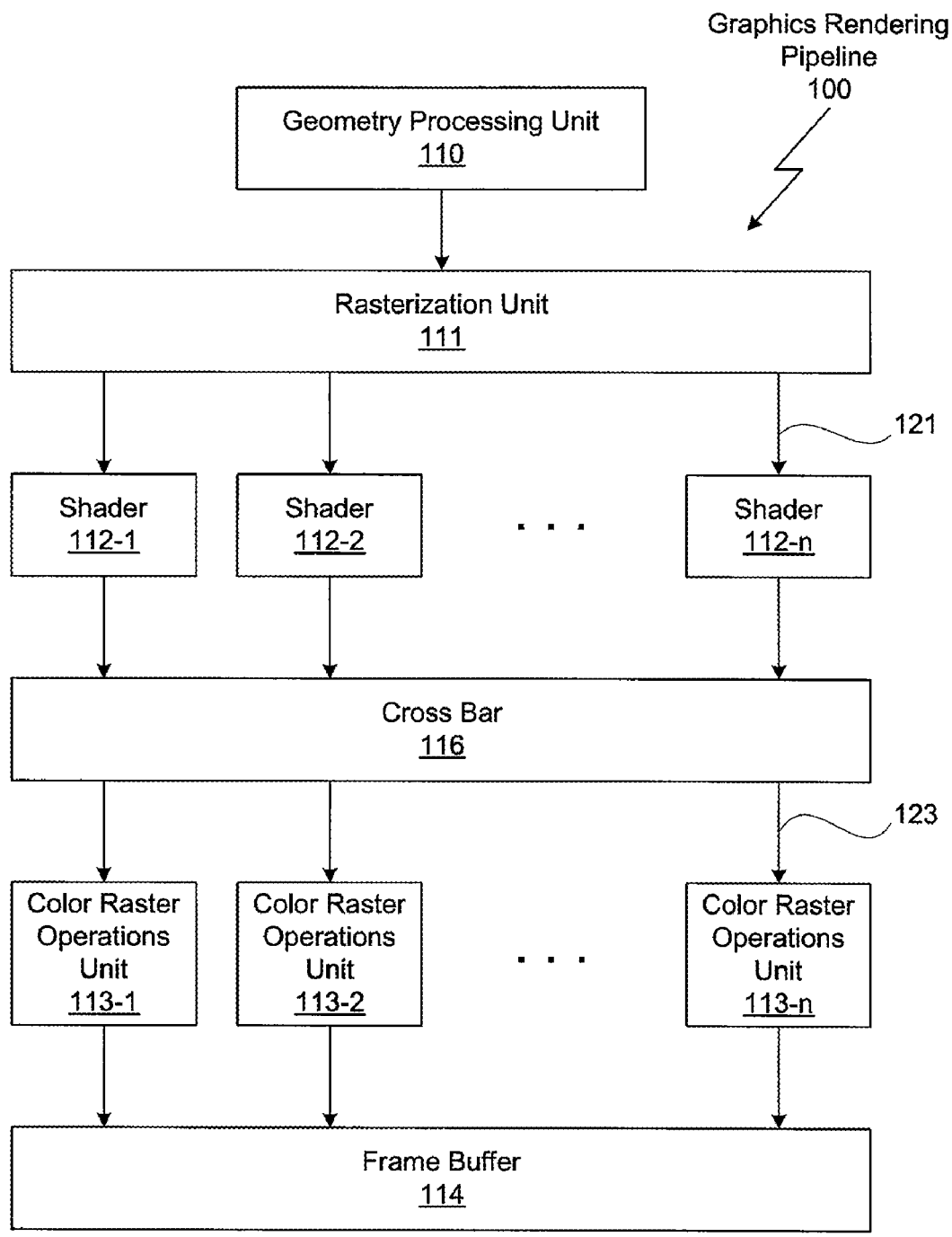
FIG. 1 is a conceptual diagram of a graphics rendering pipeline, according to one embodiment of the invention.

FIG. 1 is a conceptual diagram of a graphics rendering pipeline 100, according to one embodiment of the invention. A geometry processing unit 110 receives geometry primitives, typically triangles, from a graphics application (not shown) and conducts geometric transforms as specified by the graphics application. The output of the geometry processing unit 110 includes triangles transformed and projected onto a two-dimensional surface, referred to as "screen space," corresponding to a window on the viewer's screen. Alternately, a two-dimensional surface in screen space may be used as the destination rendering surface in applications that do not immediately display rendered frame buffer data to a screen. Such applications include rendering to environment maps or high-dynamic-range off screen buffers.

The geometric primitives in screen space generated by the geometry processing unit 110 are distributed to one or more rasterization units 111, which converts them into fragments, corresponding to screen space pixels that are least partially covered by the geometric primitives. In decomposing geometric primitives into fragments, the rasterization units 111 determine the screen space pixel coverage of each geometric primitive along with the sample coverage of each fragment. Additionally, the rasterization units 111 determine the screen space coverage and alignment of each geometric primitive with respect to memory tiles. The rasterization units 111 generate output data streams 121 that include, without limitation, fragments that include geometric coverage and depth information.

Shaders 112, represented by shader 112-1 through shader 112-n, receive fragments from the rasterization units 111 and process the fragments into shaded pixels, according to shading instructions specified by the graphics application. Crossbar 116 conveys shaded pixels (pixel fragments) from shaders 112 to color raster operations units (CROPs) 113, represented by CROP unit 113-1 through CROP unit 113-n, for further processing. The CROP units 113 perform any needed blending on the shaded pixels or samples, as specified by the graphics application.

The frame buffer 114 includes, without limitation, buffers for depth information and buffers for color information. The frame buffer 114 is typically structured as a two-dimensional surface mapped into linear memory space. A video refresh unit 115 provides a video output stream to a display device (not shown) for viewing by a user.

Persons skilled in the art will recognize that the present invention is not limited in any way by the architecture of FIG. 1. In particular, the teachings of the present invention are equally applicable in graphics rendering pipelines having one or more geometry processing units, one or more rasterization units, one or more shaders, one or more CROP units, one or more units for z-processing and one or more frame buffers. For this reason, the remainder of the description may include references to particular elements of the graphics rendering pipeline in either singular or plural form without any intention to limit the scope of the present invention.

As previously discussed, multi-sampling uses a coverage mask along with one color value per shaded pixel to define the contribution of the shaded pixel to the corresponding pixel within the rendered image. The coverage mask associated with the shaded pixel specifies which samples from the shaded pixel should be blended with or written to the corresponding pixel within the rendered image if the shaded pixel passes depth and stencil testing. For example, a partially transparent sample within a shaded pixel that survives depth testing may be blended with the corresponding sample within the rendered image to determine the new sample color for the corresponding pixel within the rendered image.

In order to preserve the proper set of sample color values contributed by each shaded pixel to the corresponding pixel within the rendered image, the associated samples may be expanded for blending and storage within the frame buffer 114, according to the fragment coverage. In many cases, a single color value is sufficient to represent all the samples associated with a given pixel. Such pixels are said to be reducible. For example, when a shaded pixel fully covers the corresponding pixel in the rendered image, then only one color value is needed for the pixel. When all of the pixels within a two-dimensional tile of pixels stored in the frame buffer 114 are reducible, then the entire tile is reducible and may be stored in a compressed format. As discussed in greater detail below, frame buffer data 123 may be processed in a reduced or an expanded format.

In one embodiment of the present invention, the shader 112 and the CROP unit 113 are designed to process eight pixels in parallel, and when rendering with four samples per pixel, a memory tile includes a four pixel wide by two pixel tall memory tile. In other words, the memory tile is eight samples wide by four samples tall. In a compressed format, the eight pixels within the tile may be fully represented by a selected eight samples within the tile. Thus, in a commonly occurring case, the CROP unit 113 can process eight compressed pixels (i.e., eight samples) in parallel by accessing compressed data from the frame buffer and processed that data. In a less common case, the CROP unit 113 can process two uncompressed pixels (i.e., two groups of four samples) in parallel by accessing expanded, uncompressed data from the frame buffer and processing that data. In both cases, the internal processing rate matches memory bandwidth, thus the utilization of the hardware within the crossbar 116 and CROP unit 113 are optimized.

Figure 2A:
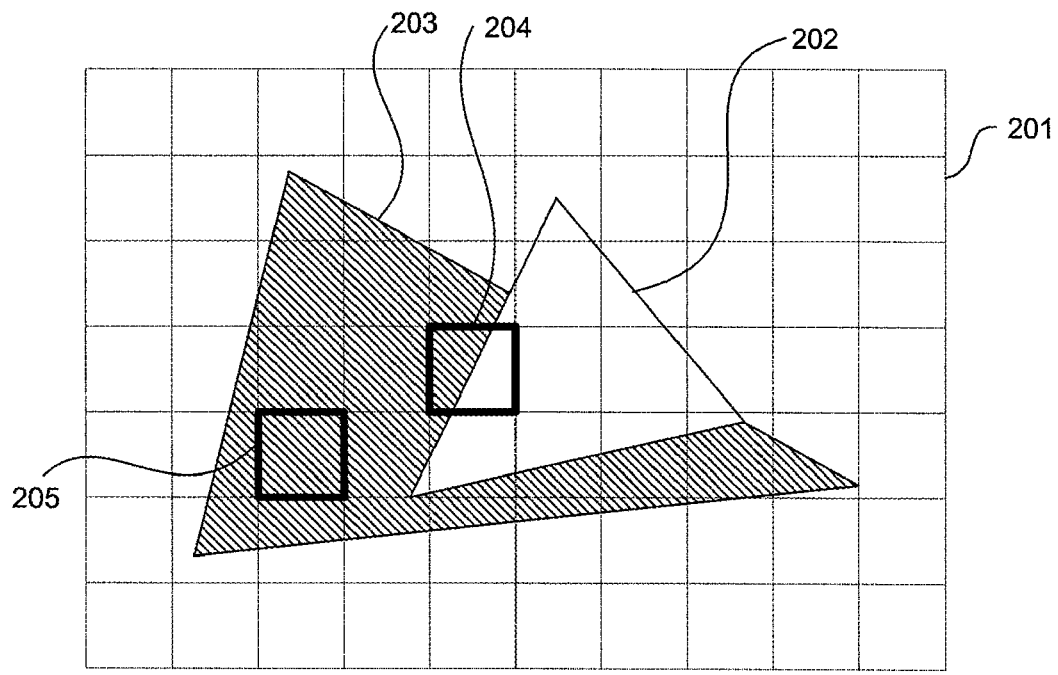
FIG. 2A illustrates two overlapping triangles on a pixel grid whereby the color of a first pixel is determined by the color of a single triangle and the color of a second pixel is determined by a blended color contribution from two triangles.

FIG. 2A illustrates two overlapping triangles 202 and 203 on a pixel grid 201 whereby the color of a first pixel 205 is determined by the color of a single triangle 203 and the color of a second pixel 204 is determined by a blended color contribution from two triangles 202 and 203. As is well known, anti-aliasing provides a mechanism for pixels, such as pixel 204, that are covered by more than one geometric primitive to appear smoother and more realistic and smooth rather than pixilated or jagged. Pixels completely covered by one geometric primitive, such as pixel 205, require no such smoothing. One conventional approach to anti-aliasing is multi-sampling, whereby two or more samples are used to compute the final color value of a given pixel. The samples associated with each fragment corresponding to a particular pixel are accumulated in the color buffer during rendering. The samples for the pixel are then blended together for display or final output of the scene. For purposes of FIGS. 2A-2C, the geometric primitives under discussion are assumed to be triangles.

Figure 2B:
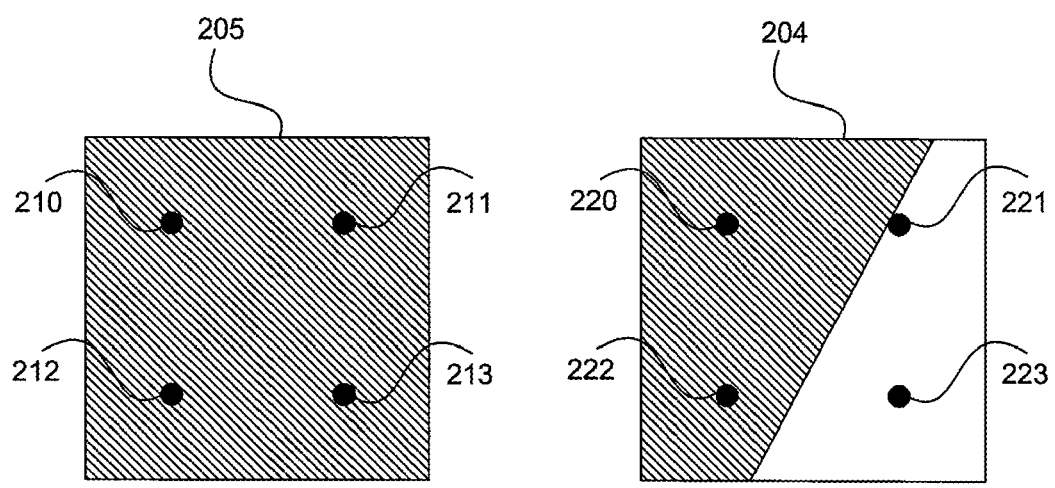
FIG. 2B illustrates two pixels, whereby the color of the first pixel is determined by the color of a single triangle and the color of the second pixel is determined by a blended color contribution of two triangles.

FIG. 2B illustrates two pixels 204, 205, whereby the color of the first pixel 205 is determined by the color of a single triangle 203, and the color of the second pixel 204 is determined by a blended color contribution of two triangles 202, 203. In this example, anti-aliasing that employs multi-sampling with four samples per pixel is shown. Again, multi-sampling may employ two or more samples per pixel to achieve valid results. Thus, the choice of four samples per pixel herein is for the purpose of discussion only and in no way limits the scope of the invention.

Each sample 210-213 of pixel 205 is associated with the same fragment since only one geometric primitive, triangle 203, covers pixel 205. Thus, all four samples 210-213 are derived from the same geometric primitive, triangle 203. While, in theory, all four samples 210-213 may have independently computed color values, in practice, and according to the definition of anti-aliasing using multi-sampling, all four samples 210-213 are all assigned the same color value since the cost of independently computing four different color samples from the same geometric primitive would be quite high, but would only minimally improve image quality. These four samples are referred to as "sibling samples," as they are all generated from the same parent geometric primitive. Importantly, since all sibling samples are assigned the same color value, only one color value is needed in pixel 205 to uniquely describe all 4 samples, which are redundant.

The color of pixel 204 is the result of blending contributions from triangles 202 and 203 and, thus, is derived from two fragments. The two triangles may have very different colors, requiring data from at least one sample from each fragment to be blended to compute the final color value for pixel 204. Another pixel may include four fragments generated from four different triangles. In such a case, there would be one sample per fragment, and each sample would have a different color value. Thus, for a given pixel, one to four sample color values are needed to determine the final color value of that pixel. If only one color value is needed because the samples are all sibling samples, the pixel is said to be "reducible," meaning that it is capable of being represented by a single color value rather than N independent samples.

Figure 2C:
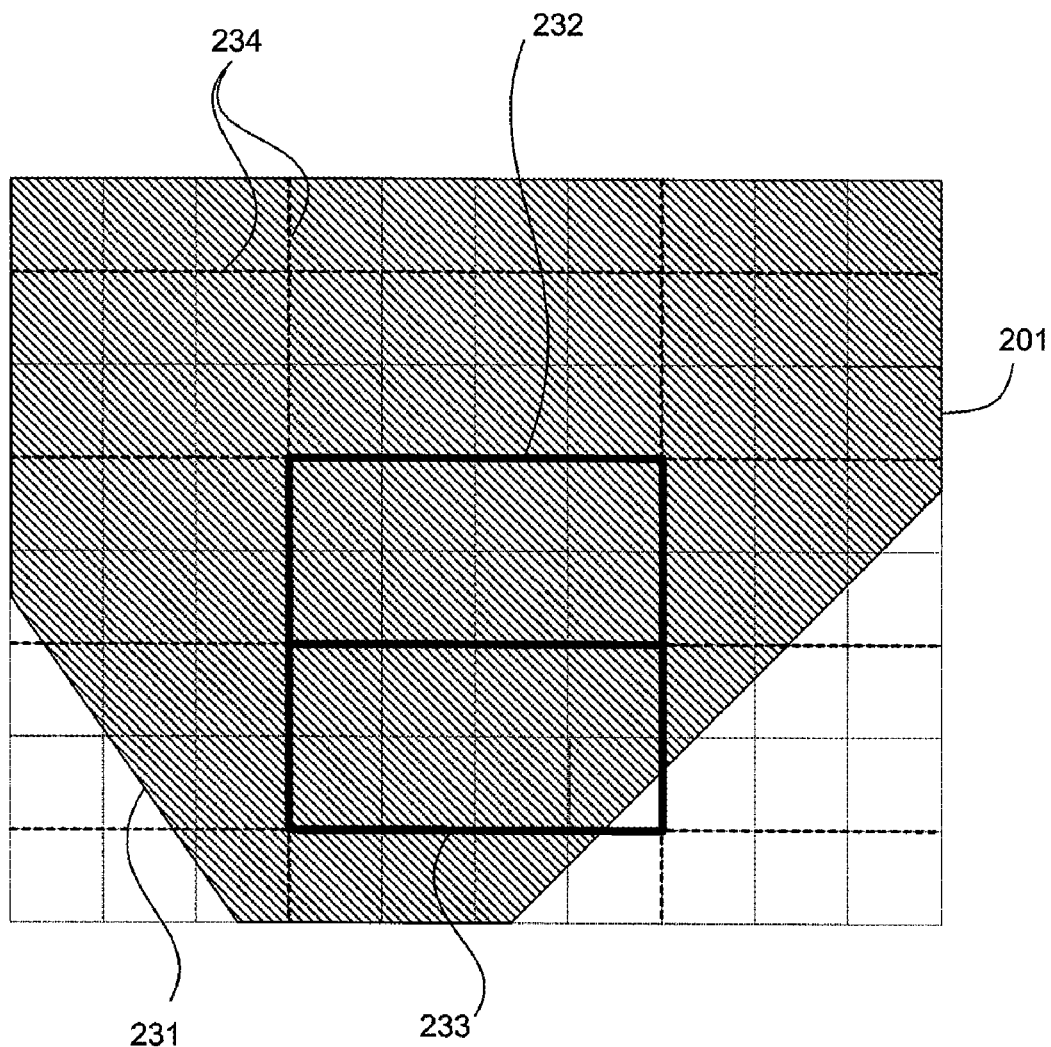
FIG. 2C illustrates a portion of a triangle on a pixel grid showing a memory tile alignment, where a first memory tile is eligible for compression and a second memory tile is not eligible for compression, according to one embodiment of the invention.

FIG. 2C illustrates a portion of a triangle 231 on a pixel grid 201 showing a memory tile alignment 234, where a first memory tile 232 is eligible for compression and a second memory tile 233 is not eligible for compression, according to one embodiment of the invention. In one embodiment, pixels are stored in frame buffer memory in arrays of four-by-two pixels (eight-by-four samples), called memory tiles. Each such memory tile is a contiguous span of memory and represents a two-dimensional region of the corresponding surface within the memory. Furthermore, each memory tile is treated as a data structure capable of representing multiple data, such as compressed and uncompressed formats. When data is stored in a compressed format, less memory bandwidth is required to store and retrieve that data. As taught in U.S. Pat. No. 6,825,847, each memory tile has an associated on-chip memory that stores a bit indicating whether a particular memory tile is compressed. When a memory tile is stored in frame buffer memory, a bit in the on-chip memory is set to indicate status (compressed of uncompressed) of the memory tile. When a memory tile is read from frame buffer memory, the associated status bit in the on-chip memory is queried to determine whether the data being accessed is compressed or uncompressed.

Figure 3A:
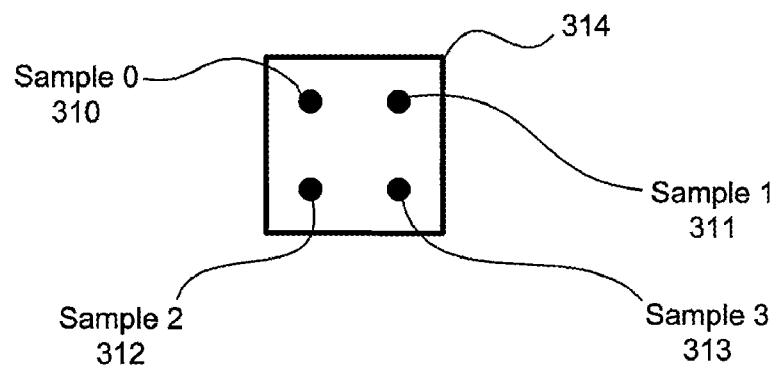
FIG. 3A is a conceptual drawing of a single pixel with four samples, according to one embodiment of the invention.

FIG. 3A is a conceptual drawing of a single pixel 314 with four samples 310-313, according to one embodiment of the invention. Each sample uses four bytes of memory, while each pixel uses sixteen bytes of memory, and a sixteen byte transfer size is used when writing data to and reading data from a frame buffer 114 of FIG. 1. Each access to memory is therefore a multiple of sixteen bytes.

Figure 3B:
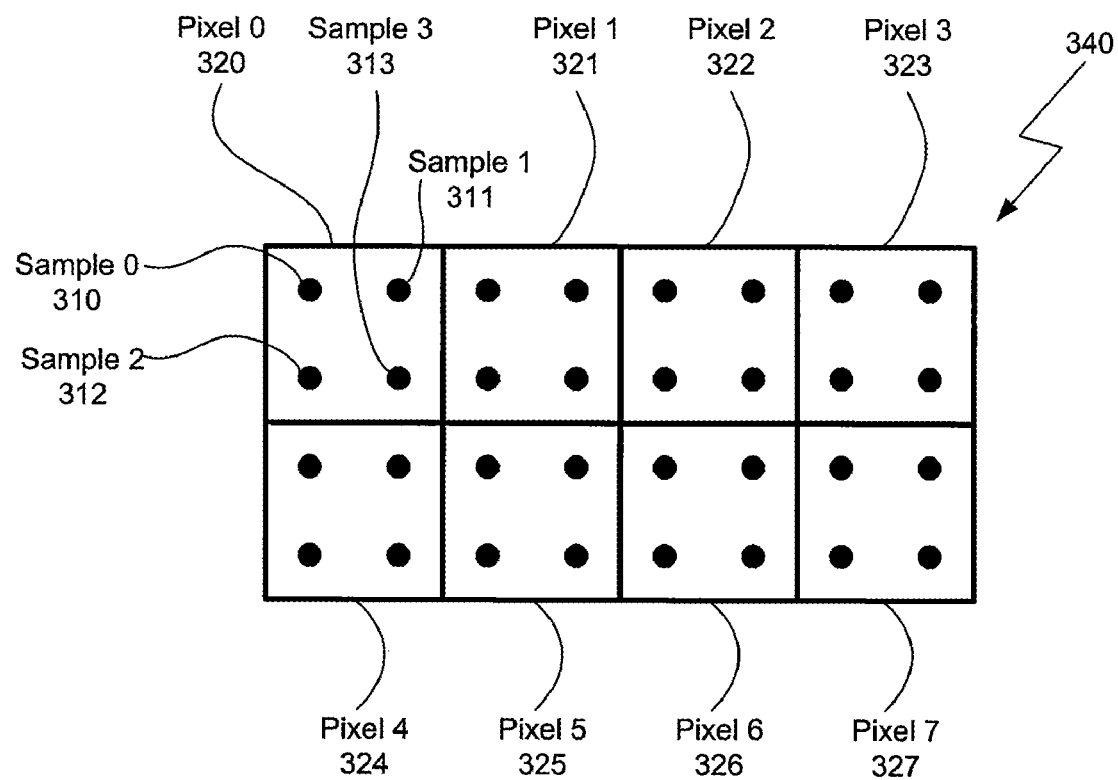
FIG. 3B illustrates the organization of an uncompressed eight-by-four sample memory tile, corresponding to a four-by-two array of pixels in screen space, according to one embodiment of the invention.

FIG. 3B illustrates the organization of an uncompressed eight-by-four sample memory tile 340, corresponding to a four-by-two array of pixels in screen space, according to one embodiment of the invention. As shown, each pixel 320-327 has four corresponding samples. For example, pixel 0 320 includes samples 310-313. As described above, in the case where memory tile 340 is completely covered by a geometric primitive, the color value of each pixel 320-327 may be represented by the color value of one sample of each respective pixel, since all samples associated with a given pixel are sibling samples. Thus, color data associated with pixels 320-327 need not be expanded from a color value per pixel to a color value per sample.

Figure 4:
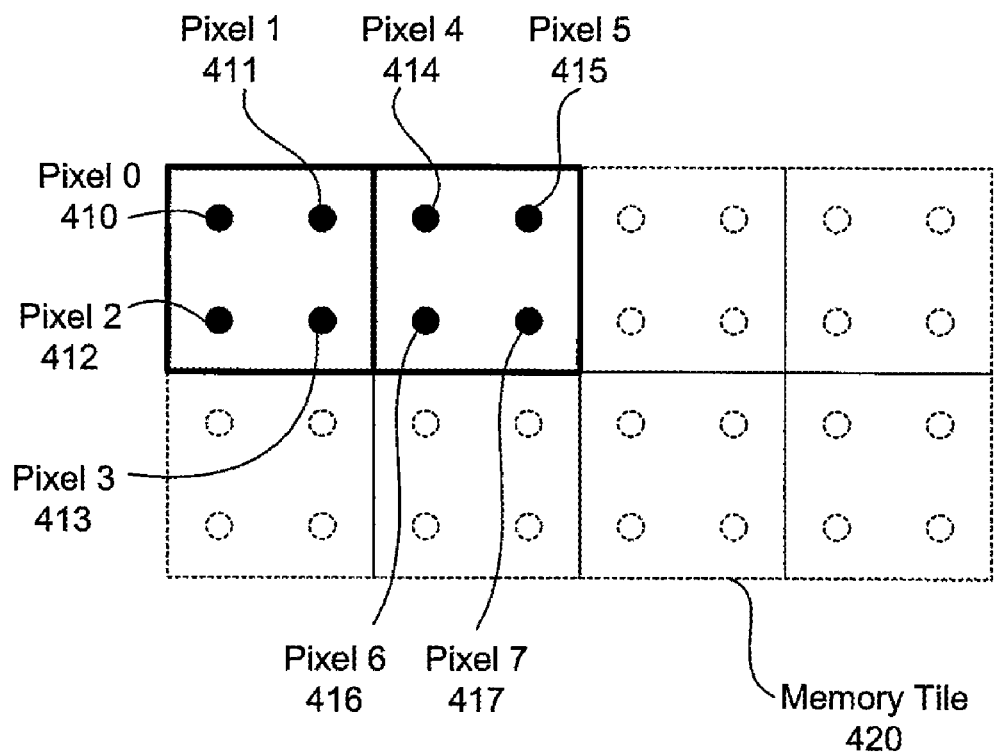
FIG. 4 illustrates the organization of a compressed eight-by-four sample memory tile, corresponding to a four-by-two array of pixels in screen space, according to one embodiment of the invention.

FIG. 4 illustrates the organization of a compressed eight-by-four sample memory tile 420, corresponding to a four-by-two array of pixels in screen space, according to one embodiment of the invention. This compressed representation is only possible when all eight pixels 410-417 in the memory tile are reducible and may therefore be represented by one sample each. As shown, when all eight pixels 410-417 are reducible, they may be re-mapped to eight contiguous sample locations normally used for the first two pixels of every memory tile 420. This re-mapping places the eight pixels 410-417 in the first thirty-two bytes of the memory tile 420. Furthermore, the starting address of the memory tile 420 remains the same for uncompressed and compressed formats, advantageously allowing common address calculations regardless of reducibility. The CROP unit 113 is able to process the eight samples 410-417 (representing the eight pixels) in parallel, enabling a throughput of eight pixels per time unit for compressed tiles within the graphics rendering pipeline 100.

Three principles are at work in the above discussion. The first principle is that anti-aliased pixels that are fully covered by a single geometric primitive contain samples of identical color, allowing the samples to be represented by a single color value. The second principle is that of allowing both compressed and uncompressed pixel data to be stored in memory tiles such that clients of the frame buffer memory (e.g., the raster operations unit) can selectively store color data in a compressed format whenever possible, thus achieving a net reduction in the memory bandwidth requirements of the system. The third principle is that of identifying groups of pixels that may be processed without expanding the pixels into their uncompressed format and processing the pixels in their reduced form, thereby reducing the size of the data path logic needed to process the pixels in compressed format at a specified throughput.

Figure 5A:
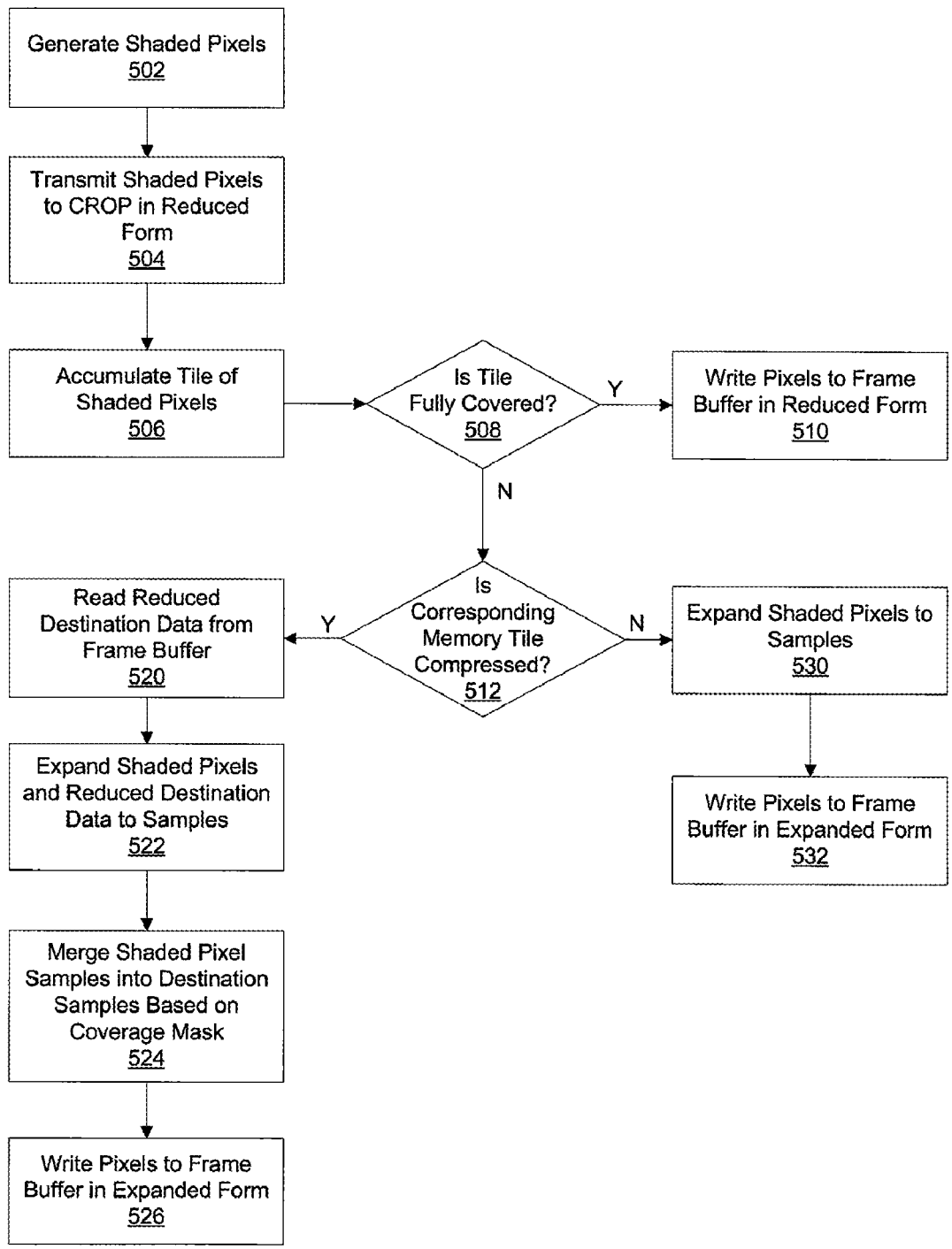
FIG. 5A is a flow diagram of method steps for processing non-blended color data of multi-sampled pixels, according to one embodiment of the invention.

FIG. 5A is a flow diagram of method steps for processing non-blended color data of multi-sampled pixels, according to one embodiment of the invention. Although the method steps are described in conjunction with the systems of FIGS. 1 and 6, persons skilled in the art will understand that any system that performs the method steps, in any order, is within the scope of the invention.

The method begins in step 502, where a shader unit generates multiple shaded pixels, according to programming instructions specified by a graphics application. In step 504, the shader unit transmits the shaded pixels to a CROP unit in reduced form. In reduced form, each pixel includes one color value that represents the potential color values of multiple samples within the shaded pixel, together with a sample coverage mask. In step 506, the shaded pixels associated with a screen space tile are accumulated within the CROP unit (referred to herein as a "tile of shaded pixels"). One component of the accumulated data is a coverage mask that represents the intersection of the currently rasterized geometric primitive and the tile of shaded pixels. In step 508, the CROP unit determines whether the tile of shaded pixels is fully covered by the geometric primitive. If so, then the method proceeds to step 510, where the CROP unit writes the accumulated shaded pixels to the frame buffer in reduced form. The method terminates after completing step 510. In alternative embodiments, coverage may be determined prior to transmitting the shaded pixels to the CROP unit. For example, a tile of shaded pixels may be accumulated upstream of the CROP unit and coverage may be determined by an upstream unit prior to sending the tile to the CROP unit or coverage may be tracked by maintaining a flag per tile that is cleared if any samples are discarded or uncovered.

If, in step 508, the CROP unit determines that the corresponding frame buffer tile is not fully covered, then the method proceeds to step 512. If, in step 512, the CROP unit determines that the frame buffer or memory tile corresponding to the tile of shaded pixels is compressed, meaning that the pixels included within the frame buffer tile (also referred to as "destination data") are stored in a reduced form, then the method proceeds to step 520, where the CROP unit reads the destination data stored in reduced form from the frame buffer. In step 522, the shaded pixels and the destination data (i.e., the pixels included within the frame buffer tile) are expanded to individual samples. In step 524, the samples associated with the expanded shaded pixels are merged into the samples associated with the expanded destination data, based on the coverage mask associated with the tile of shaded pixels. In step 526, the CROP unit writes the pixels resulting from step 524 to the frame buffer in expanded form. The method terminates after completing step 526.

If, in step 512, the CROP unit determines that the frame buffer tile corresponding to the tile of shaded pixels is not compressed, meaning that the destination data is not stored in a reduced form (i.e., stored in an expanded form), then the method proceeds to step 530. In step 530, the CROP unit expands the shaded pixels to individual samples, and the method proceeds to step 532. In step 532, the CROP unit writes the pixels resulting from step 530 to the frame buffer in expanded form, using byte enables to selectively update the covered samples.

Figure 5B:
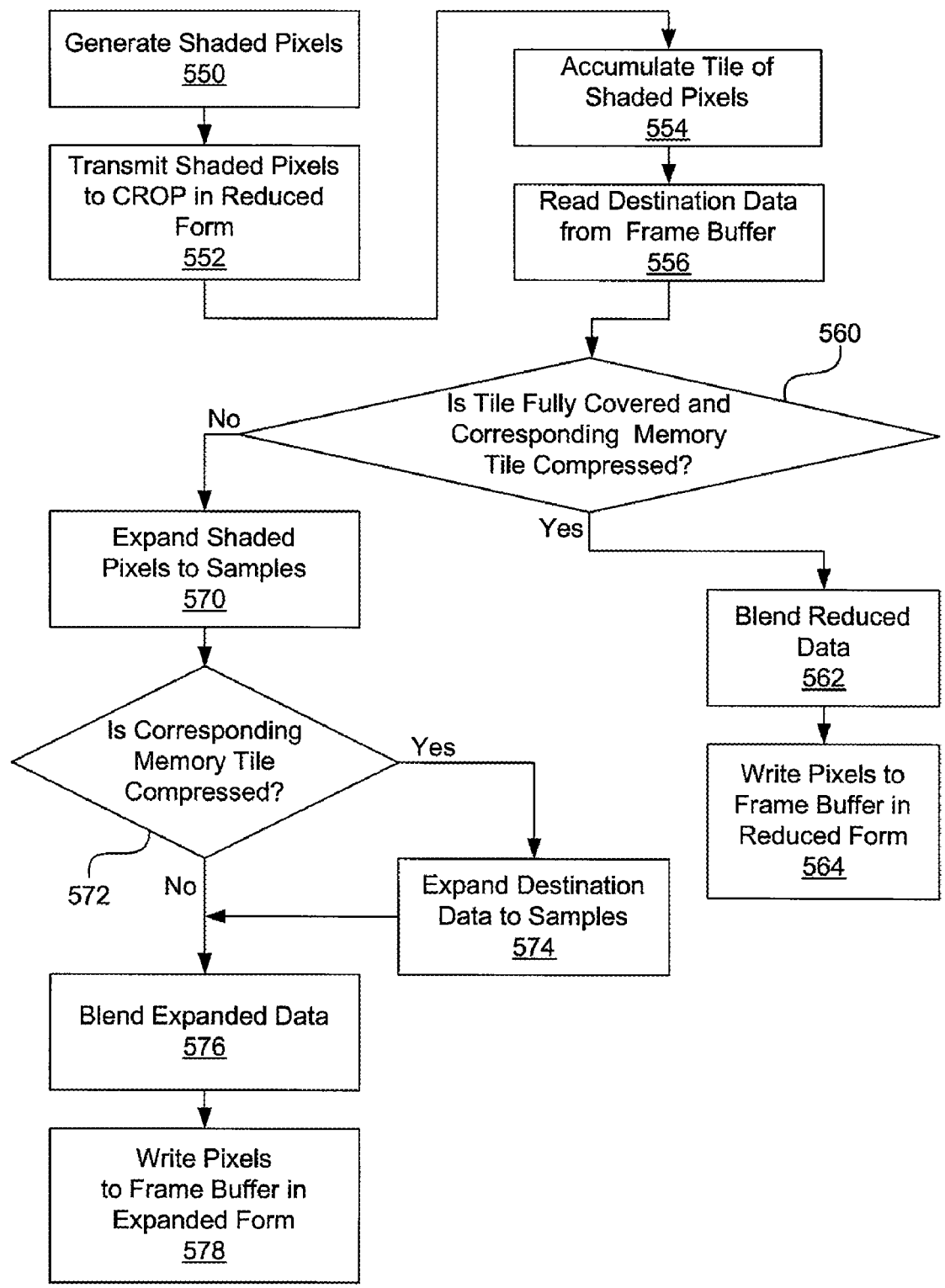
FIG. 5B is a flow diagram of method steps for processing blended color data of multi-sampled pixels, according to one embodiment of the invention.

FIG. 5B is a flow diagram of method steps for processing blended color data of multi-sampled pixels, according to one embodiment of the invention. Although the method steps are described in conjunction with the systems of FIGS. 1 and 6, persons skilled in the art will understand that any system that performs the method steps, in any order, is within the scope of the invention.

The method begins in step 550, where shader unit generates multiple shaded pixels, according to programming instructions specified by a graphics application. In step 552, the shader unit transmits the shaded pixels to a CROP unit in reduced form. Again, in reduced form, each pixel includes one color value that represents the potential color values of multiple samples within the shaded pixel and a sample coverage mask. In step 554, the shaded pixels associated with a screen space tile are accumulated within the CROP unit (again, referred to as a "tile of shaded pixels"). One component of the accumulated data is a coverage mask that represents the intersection of a currently rasterized geometric primitive and the tile of shaded pixels. In step 556, the CROP unit reads destination data from the frame buffer. Again, the destination data is the pixel data within a frame buffer tile that corresponds to the tile of shade pixels. If, in step 560, the CROP unit determines that the tile of shaded pixels is fully covered by the geometric primitive and that the frame buffer tile is compressed, meaning that the destination data is stored in a reduced form, then the method proceeds to step 562. In step 562, the CROP unit blends the shaded pixels, represented in reduced form, with the pixels within the destination data, also represented in reduced form. That is, only the representative color value of a given shaded pixel is blended with the corresponding representative color value of a pixel within the destination data to produce each resulting pixel. By blending only the one color value that represents the potential color values of multiple samples within the shaded pixel, only a fraction of the computational load and memory bandwidth are required when compared to blending each sample of each pixel. In step 564, the CROP unit writes the resulting pixels to the frame buffer in reduced form. The method terminates after completing step 564. As set forth above with respect to FIG. 5A, the accumulation of the tile and determination of coverage may occur upstream of the CROP unit in various alternative embodiments.

If, in step 560, the CROP unit determines either that the tile of shaded pixels is not fully covered by the geometric primitive or that the frame buffer tile is not compressed, meaning that the destination data is stored in an expanded form, then the method proceeds to step 570. In step 570, the accumulated shaded pixels are expanded to individual samples for processing. If, in step 572, the frame buffer tile is not compressed, then the method proceeds to step 576, where the CROP unit blends the expanded shaded pixels with the expanded destination pixels read from the frame buffer. That is, each sample of each expanded shaded pixel is blended with the corresponding sample of the destination pixel. In step 578, the CROP unit writes the blended pixels generated in step 576 to the frame buffer in expanded form. The method terminates after completing step 578.

If, in step 572, the frame buffer tile is compressed, meaning that the destination data is stored in reduced form, then the method proceeds to step 574. In step 574, the CROP unit expands the destination data to individual samples for processing. The method then proceeds to step 576, described above.

Figure 6:
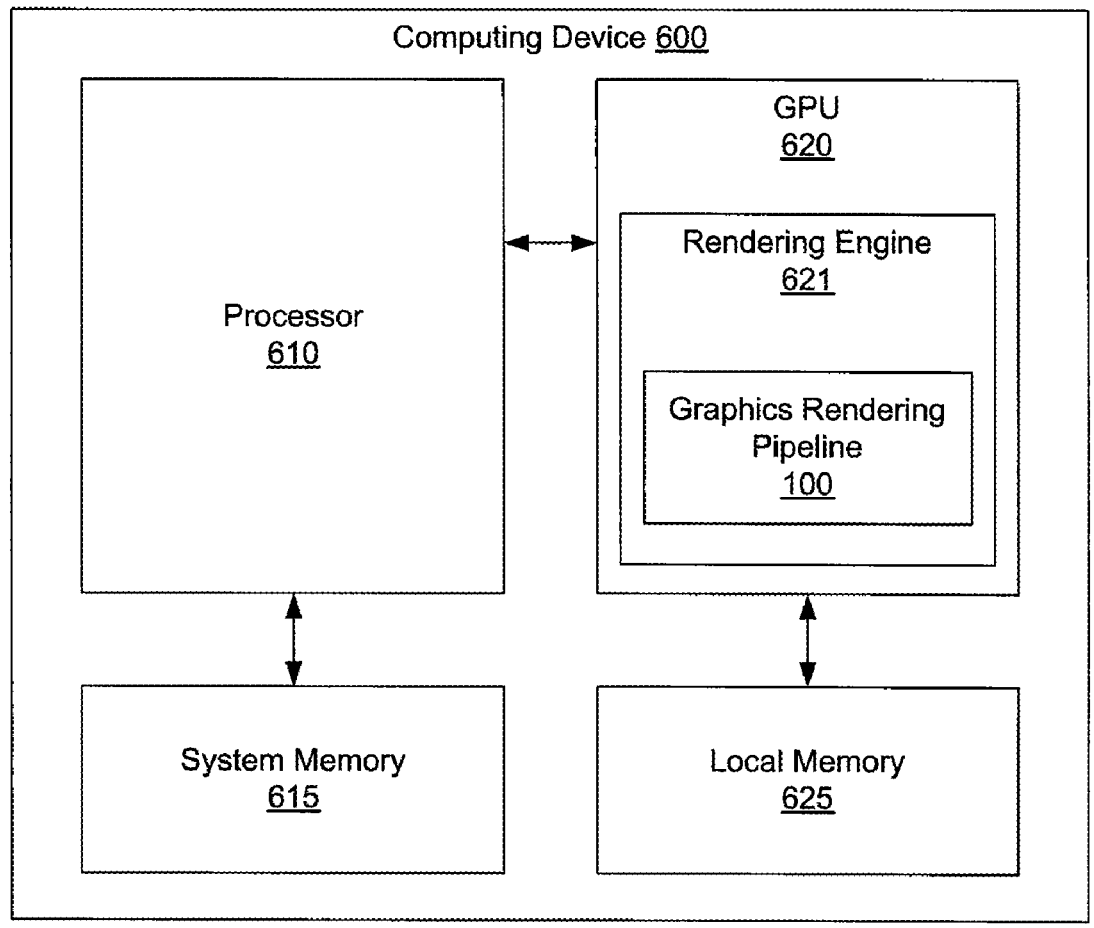
FIG. 6 is a conceptual diagram of a computing device configured to implement one or more aspects of the present invention.

FIG. 6 is a conceptual diagram of a computing device 600 configured to implement one or more aspects of the present invention. The computing device 600 includes, without limitation, a processor 610, system memory 615, a graphics processing unit (GPU) 620 and local memory 625 connected to the GPU 620. The GPU 620 includes at least one rendering engine 621 used to process data. The rendering engine 621 includes at least one graphics rendering pipeline 100 used to process data, as described above. Persons skilled in the art will recognize that any system having one or more processing units configured to implement the teachings disclosed herein falls within the scope of the present invention. Thus, the architecture of computing device 600 in no way limits the scope of the present invention.

While the forgoing is directed to embodiments of the present invention, other and further embodiments of the invention may be devised without departing from the basic scope thereof. Therefore, the scope of the present invention is determined by the claims that follow.

We claim:

1. A graphics pipeline configured to process blended color data of multi-sampled pixels, the graphics pipeline comprising:
 a shader engine configured to generate shaded pixels in reduced form based on a currently rasterized geometric primitive, wherein the shaded pixels are not expanded into samples; and
 a color raster operations (CROP) unit configured to receive the shaded pixels in reduced form from the shader engine, to accumulate a tile of shaded pixels, to read data from a memory tile corresponding to the tile of shaded pixels, and to determine whether the memory tile is compressed.

2. The graphics pipeline of claim 1, further comprising a means for determining whether the tile of shaded pixels is fully covered by the geometric primitive.

3. The graphics pipeline of claim 2, wherein the means comprises the CROP unit.

4. The graphics pipeline of claim 3, wherein the tile of shaded pixels is fully covered and the memory tile is compressed, and the CROP unit is further configured to blend the data from the memory tile in reduced form with the accumulated shaded pixels in reduced form to produce final pixel data.

5. The graphics pipeline of claim 4, wherein the CROP unit is further configured to write the final pixel data to memory in reduced form.

6. The graphics pipeline of claim 3, wherein either the tile of shaded pixels not fully covered by the geometric primitive or the memory tile is not compressed, and the CROP unit is further configured to expanded the accumulated shaded pixels into samples.

7. The graphics pipeline of claim 6, wherein the memory tile is compressed, and the CROP unit is further configured to expand data stored in the memory tile in reduced form into samples and to blend the samples from the memory tile with the samples from the accumulated shaded pixels to produce final pixel data.

8. The graphics pipeline of claim 7, wherein the CROP unit is further configured to write the final pixel data to memory in expanded form.

9. The graphics pipeline of claim 6, wherein the memory tile is not compressed, and the CROP unit is further configured to blend data stored in the memory tile in expanded form with the samples from the accumulated shaded pixels to produce final pixel data.

10. The graphics pipeline of claim 9, wherein the CROP unit is further configured to write the final pixel data to memory in expanded form.

11. A computing device configured to process blended color data of multi-sampled pixels, the computing device comprising:
 a memory; and
 a processor coupled to the memory and having a graphics processing pipeline that includes:
  a shader engine configured to generate shaded pixels in reduced form based on a currently rasterized geometric primitive, wherein the shaded pixels are not expanded into samples, and
  a color raster operations (CROP) unit configured to receive the shaded pixels in reduced form from the shader engine, to accumulate a tile of shaded pixels, to read data from a memory tile corresponding to the tile of shaded pixels, and to determine whether the memory tile is compressed.

12. The computing device of claim 11, wherein the graphics processing pipeline further includes a means for determining whether the tile of shaded pixels is fully covered by the geometric primitive.

13. The computing device of claim 12, wherein the means comprises the CROP unit.

14. The computing device of claim 13, wherein the tile of shaded pixels is fully covered and the memory tile is compressed, and the CROP unit is further configured to blend the data from the memory tile in reduced form with the accumulated shaded pixels in reduced form to produce final pixel data.

15. The computing device of claim 14, wherein the CROP unit is further configured to write the final pixel data to memory in reduced form.

16. The computing device of claim 13, wherein either the tile of shaded pixels not fully covered by the geometric primitive or the memory tile is not compressed, and the CROP unit is further configured to expanded the accumulated shaded pixels into samples.

17. The computing device of claim 16, wherein the memory tile is compressed, and the CROP unit is further configured to expand data stored in the memory tile in reduced form into samples and to blend the samples from the memory tile with the samples from the accumulated shaded pixels to produce final pixel data.

18. The computing device of claim 17, wherein the CROP unit is further configured to write the final pixel data to memory in expanded form.

19. The computing device of claim 16, wherein the memory tile is not compressed, and the CROP unit is further configured to blend data stored in the memory tile in expanded form with the samples from the accumulated shaded pixels to produce final pixel data.

20. The computing device of claim 19, wherein the CROP unit is further configured to write the final pixel data to memory in expanded form.

* * * * *